United States Patent [19]

Kniss et al.

[11] Patent Number: 4,866,298
[45] Date of Patent: Sep. 12, 1989

[54] CIRCUIT ARRANGEMENT FOR EVALUATING THE SIGNALS OF AN INDUCTIVE SENSOR

[75] Inventors: Helmut Kniss, Waiblingen; Wolfgang Schmidt, Vaihingen/Enz, both of Fed. Rep. of Germany

[73] Assignee: Robert Bosch GmbH, Stuttgart, Fed. Rep. of Germany

[21] Appl. No.: 167,012

[22] Filed: Mar. 11, 1988

[30] Foreign Application Priority Data

Mar. 13, 1987 [DE] Fed. Rep. of Germany ....... 3708210

[51] Int. Cl.$^4$ .......................... H03K 5/08; H03K 5/24
[52] U.S. Cl. .................................... 307/268; 307/358; 328/5
[58] Field of Search ............... 307/261, 268, 358, 362, 307/359, 515; 328/1, 5

[56] References Cited

U.S. PATENT DOCUMENTS

| | | | |
|---|---|---|---|
| 4,169,232 | 9/1979 | Henrich | 307/358 |
| 4,267,470 | 5/1981 | Kawakami et al. | 307/358 |
| 4,305,037 | 12/1981 | Breckel | 307/358 |
| 4,532,437 | 7/1985 | Bodig et al. | 328/1 |
| 4,682,049 | 7/1987 | Kirschner et al. | 328/5 |

Primary Examiner—John Zazworsky
Attorney, Agent, or Firm—Walter Ottesen

[57] ABSTRACT

The invention is directed to a circuit arrangement for evaluating the signals of an inductive sensor such as the kind utilized on internal combustion engines. The coil of the inductive sensor is connected via a coupling capacitor to a differential amplifier connected in the form of a comparator. The coil of the sensor is also connected via the coupling capacitor to a resistance for equalizing charge as well as to a peak-value detector. The peak-value detector is connected to the input of the comparator either directly or via an amplifier circuit and effects a threshold adjustment for the comparator which occurs in dependence upon the signal supplied by the inductive sensor and in dependence upon the rotational speed. Manufacturing variations of the inductive sensor as well as temperature changes have no influence on the output signal.

12 Claims, 1 Drawing Sheet

4,866,298

CIRCUIT ARRANGEMENT FOR EVALUATING THE SIGNALS OF AN INDUCTIVE SENSOR

FIELD OF THE INVENTION

The invention relates to a circuit arrangement for evaluating the output signals of an inductive sensor disposed on an internal combustion engine.

BACKGROUND OF THE INVENTION

A circuit arrangement of this kind is disclosed in U.S. Pat. No. 4,682,049 wherein an inductive sensor such as a sensor for detecting the crankshaft angle of an internal combustion engine is dc-connected via a voltage divider to the input of a Schmitt-Trigger and to a peak-value detector. The trigger threshold of the Schmitt-Trigger is adjusted in dependence upon the output signal of the peak-value detector.

SUMMARY OF THE INVENTION

The circuit arrangement according to the invention affords the advantage that sensor tolerances and temperature changes do not act upon the output signal. According to a feature of the invention, a coupling capacitor is connected between the inductive sensor and the circuit arrangement and a charge-equalization resistor for the coupling capacitor is provided. It is especially advantageous that a time information can be derived from the signal supplied by the sensor without the occurrence of an inherent shift caused by an amplitude change of the measurement signal. Further, manufacturing variations of the inductive sensors are compensated.

According to a feature of the circuit arrangement of the invention, a peak-value detector for the signal supplied by the inductive sensor is provided. The peak value detector includes a switch which is preferably a diode and a capacitor. A dynamic positive feedback is provided for the difference amplifier connected as a comparator.

According to another feature of the invention, an amplifier is provided between the peak-value detector and the comparator. In this way, the effect of a threshold adjustment for the comparator can be influenced within wide limits.

The circuit arrangement according to the invention is especially suitable for evaluating the signals of a needle-stroke sensor which senses the nozzle needle of a fuel-injection nozzle of an internal combustion engine.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
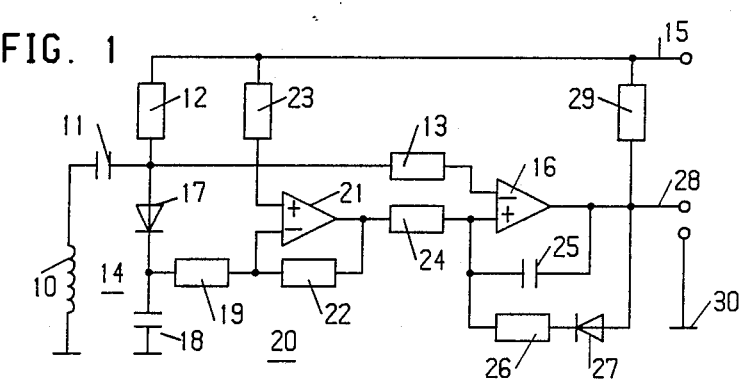
FIG. 1 is an embodiment of a circuit arrangement according to the invention for evaluating the signals of an inductive sensor and includes an inverting amplifier circuit in the form of an operational amplifier.

FIG. 1 shows a first embodiment t of the circuit arrangement according to the invention. A coil 10 of an inductive sensor, not shown in greater detail, is connected to the charge-equalization resistor 12 via a coupling capacitor 11. The coil 10 is also connected to an isolating resistor 13 and a peak-value detector 14 via the coupling capacitor 11. The charge-equalization resistor 12 is connected to the current-supply line 15 supplied with a stabilized voltage. The isolating resistor 13 is connected with the inverting input of a differential amplifier 16. The peak-value detector 14 includes a diode 17 whose cathode is connected with a peak-value storage capacitor 18 as well as with an input resistor 19 of an amplifier 20. The amplifier 20 is realized as an inverting amplifier circuit with an operational amplifier 21. The amplification is adjusted with an input resistor 19, which is connected with the inverting input of the operational amplifier 21 as well as with a negative feedback resistor 22 which leads from the output of the operational amplifier 21 to the inverting input thereof. The reference level of the amplifier 20 is set to the value of the stabilized voltage of the current-supply line 15 by means of the resistor 23. The resistor 23 leads from the current-supply line 15 to the non-inverting input of the operational amplifier 21. The output of the operational amplifier 21 is connected with the non-inverting input of the differential amplifier 16 via a summing resistor 24. This input is further connected with a positive-feedback capacitor 25 as well as with a series circuit which contains a positive-feedback resistor 26 as well as a diode 27. The positive-feedback capacitor 25 as well as the diode 27 lead to the output terminal 28 of the differential amplifier 16. The output 28 is connected with the current-supply line 15 via a load resistor 29. The output signal of the circuit arrangement according to the invention is present between the output 28 and ground 30. The peak-value storage capacitor 18 as well as a terminal of the coil 10 of the inductive sensor are also connected to ground 30.

Figure 2:
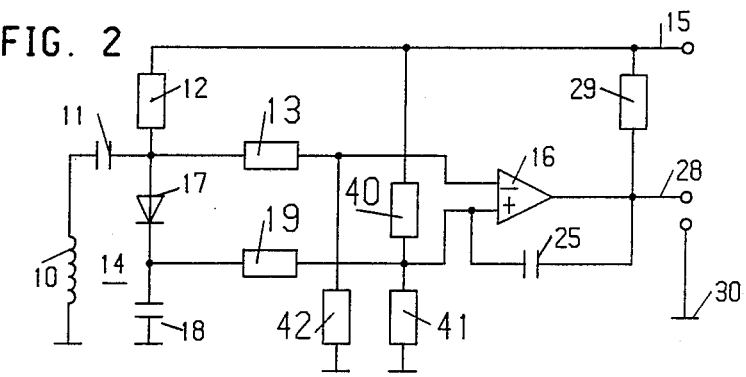
FIG. 2 is another embodiment of the circuit arrangement according to the invention which does not include the above-mentioned amplifier; and, FIG. 3 is a third embodiment of the circuit arrangement according to the invention in which a voltage divider present in the embodiment according to FIG. 2 is omitted.

FIG. 2 is a schematic of a second embodiment of the circuit arrangement according to the invention. The same reference numerals are utilized in FIG. 2 as were utilized in FIG. 1 where the elements referred to are the same and only the differences which occur with respect to FIG. 1 are described for FIG. 2.

The main difference between the embodiments of FIGS. 1 and 2 is the omission of the amplifier 20. The input resistor 19 leads to the center connection of a voltage divider connected between the supply line 15 and ground 30. The voltage divider is formed by the resistors 40 and 41. The center connection is connected with the non-inverting input of the differential amplifier 16 to which, in turn, the positive feedback capacitor 25 is connected. The inverting input of the differential amplifier 16 is connected with the isolating resistor 13 and with an operating-point adjusting resistor 42 connected to ground.

Figure 3:
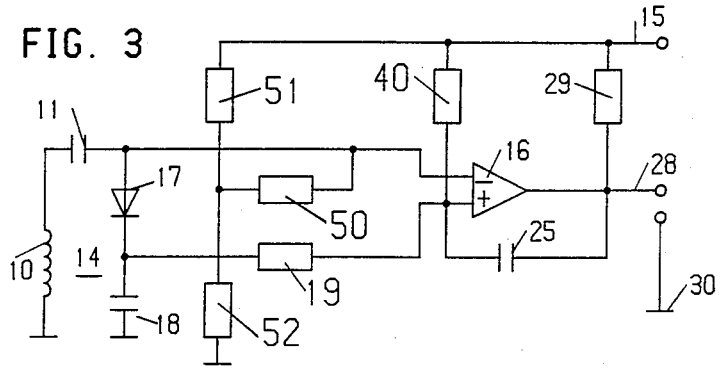

FIG. 3 is a schematic of a third embodiment of the circuit arrangement according to the invention. Here again, those components appearing in FIG. 3 which are the same as those appearing in FIGS. 1 and 2 are identified with the same reference numerals. The coupling capacitor 11 is connected directly to the inverting input of the differential amplifier 16. An operating-point adjusting resistor 50 is also connected to this inverting input. The operating-point adjusting resistor 50 leads to the center connection of a voltage divider which includes two voltage divider resistors 51 and 52. The resistors 51 and 52 are connected between the current-supply line 15 and ground. The voltage-divider resistor 41 shown in FIG. 2, which is connected between the non-inverting input of the differential amplifier 16 and ground 30, is not included in the embodiment of the circuit arrangement of FIG. 3.

The operation of the circuit arrangement of FIG. 1 is described below.

The signal induced into the coil 10 of the inductive sensor reaches the peak-value detector 14 via the coupling capacitor 11. The sensor can, for example, be a needle-stroke sensor sensitive to the nozzle needle of an injection nozzle of an internal combustion engine. The signal of the sensor begins with a positive halfwave which has an approximately sinusoidal shape and which continues over into a negative halfwave of at least the same magnitude. The beginning of the signal corresponds to the start of the injection process and the end of the signal corresponds to the end of the injection process. The information of the injection begin or of the injection end or of both values is supplied to an apparatus controlling the internal combustion engine. The quantity of fuel injected can be computed from a determination of the time difference or, more specifically, the injection duration, when the dimensions of the injection nozzle as well as the operating pressure are known.

The positive halfwave of the sensor leads to a charging of the peak-value storage capacitor 18 via the diode 17. The charge drawn from the coupling capacitor 11 is again compensated for by a current flowing through the charge-equalization resistor 12. The current flows until the potential on the coupling capacitor 11 again corresponds to the value of the stabilized voltage present on the supply line 15. The voltage present on the peak-value storage capacitor 18 is utilized for amplitude-dependent threshold adjustment and rotational speed dependent threshold adjustment for the differential amplifier 16 at whose output 28 a signal should then first occur when the signal supplied by the coil 10 exceeds the value of the changing threshold voltage. The threshold voltage is applied to the non-inverting input of the differential amplifier 16. On the one hand, the threshold voltage is taken from the voltage present on the peak-value storage capacitor 18 which is amplified in amplifier 20 and reaches the non-inverting input of the differential amplifier 16 via the summing resistor 24 and, on the other hand, from the voltage present at the output 28 which likewise reaches the non-inverting input of the differential amplifier 16 but via the positive feedback resistor 26 insofar as the diode 27 is switched in the conducting direction. This is then the case when the coil 10 delivers no signal and the output 28 of the differential amplifier 16 has approximately the value of the stabilized voltage of the current-supply line 15. Only in this operating condition is the diode 27 conductive and makes possible a connection between the output 28 and the non-inverting input of the differential amplifier 16, the connection operating as a positive feedback. The differential amplifier 16 operates as a comparator with the circuit arrangement described.

When the voltage supplied by the coil 10 exceeds the threshold voltage, then a negative voltage jump occurs at the output 28 of the differential amplifier 16. This voltage jump signals, for example, the beginning of the injection process. In the further course of the signal supplied by the coil 10 and approximately at the following zero crossover, the threshold is passed through again in the other direction and causes a positive voltage jump to occur at the output. This voltage jump is without physical meaning and therefore does not have to be recognized by a circuit arrangement connected downstream. The threshold is again exceeded in the original direction at the end of the negative halfwave of the voltage supplied by the coil 10. A negative voltage jump occurs again at the output 28 in the manner described which signals the end of injection.

Changes can occur in the magnitude of the voltage supplied by the coil 10, for example, by changes in rotational speed and changes in temperature and the like. These changes in the magnitude of this voltage have no influence on the time position of the switching flank at the output 28. A self-adjustment of the output signal 28 with reference to the changing input signal is eliminated by means of the threshold adjustment. The safety of the circuit with respect to disturbances and especially of the differential amplifier 16 is guaranteed by means of the positive feedback via the diode 27 and the positive feedback resistor 26 which positive feedback then becomes effective when the output voltage at output 28 is approximately the same as the value of the stabilized voltage on the supply line 15. In the other operating condition in which the diode 27 blocks, the positive feedback capacitor 25 provides for a dynamic positive feedback which is the same as a dynamic hysteresis.

The load resistor 29 which connects the output 28 with the supply line 15 is required when the differential amplifier 16 has an open collector output. This load resistor 29 can also be omitted in the other embodiments of the differential amplifier 16. The resistor 23 is connected between the current-supply line 15 and the non-inverting input of the operational amplifier 21 and provides that the voltage at the peak-value storage capacitor 18 is approximately the same as the value of the stabilized voltage on the current-supply line 15 during the quiescent condition of the circuit.

The circuit arrangement of FIG. 2 differs from the circuit arrangement of FIG. 1 primarily in that the voltage across the peak-value storage capacitor 18 is applied to the non-inverting input of the differential amplifier 16 without an amplification stage connected therebetween. In the quiescent state, the threshold voltage present at the non-inverting input is determined by means of both voltage-divider resistors 40 and 41. The voltage across the peak-value storage capacitor 18 is also added to the threshold voltage via the input resistor 19. The operating-point adjusting resistor 42 connected between the inverting input of the differential amplifier 16 and ground 30 makes a flexible operating point adjustment possible. The positive halfwave of the signal delivered by the coil 10 leads to a voltage change in the peak-value detector 14 which, in turn, via the resistance network made up of resistors 19, 40 and 41, leads to a change in the threshold voltage at the non-inverting input of the differential amplifier 16 operating as a comparator. This threshold adjustment only becomes effective at large signals when the threshold voltages of diode 17 are exceeded and is slowly equalized to the potential of the voltage-divider resistors 40 and 41 by means of input resistor 19. However, the main effect is important that the positive pulse of the comparator 16 is released.

The switching arrangement of FIG. 3 starts with that of FIG. 2 by deleting the voltage-divider resistor 41 and by changing the resistors 12, 13 and 19. The voltage-divider resistor 41 is connected between the non-inverting input of the differential amplifier 16 and ground 30. In the circuit arrangement of FIG. 3, the coupling capacitor 11 is connected directly to the inverting input of the differential amplifier 16. The charge equalization on the coupling capacitor 11 is provided in this embodiment via a resistor 50 which is connected at the center terminal of the voltage divider (51, 52) connected between the current-supply line 15 and ground 30. The operating point at the inverting input of the differential amplifier 16 is determined by the three resistors 50, 51 and 52. Preferably, the value of the resistor 51 is selected so as to be comparatively small in relationship to the values of both resistors 50 and 52, so that the operating point corresponds approximately with the value of the stabilized voltage on the current-supply line 15. Since the quiescent voltage at the inverting input of the differential amplifier 16 is at least approximately the same as the stabilized voltage on the supply line 15, the threshold voltage at the non-inverting input of the differential amplifier 16 must also have approximately this value. The differential amplifier 16 operates here as a comparator. For this reason, and compared to the circuit arrangement according to FIG. 2, the voltage-divider resistor 41 connected to ground 30 is omitted so that the threshold value in the quiescent state can be drawn over the remaining voltage-divider resistor 40 to approximately the value of the stabilized voltage.

The circuit arrangement of FIG. 3 has a lower tolerance of the threshold voltage in the quiescent state as compared to the circuit arrangement of FIG. 2 because of the reference to the stabilized voltage of the current-supply line 15.

It is understood that the foregoing description is that of the preferred embodiments of the invention and that various changes and modifications may be made thereto without departing from the spirit and scope of the invention as defined in the appended claims.

What is claimed is:

1. A circuit arrangement for evaluating the output signals of an inductive sensor, the circuit arrangement comprising:
    a coupling capacitor connected directly to the sensor for receiving the signal thereof;
    a comparator connected to said coupling capacitor for receiving said signal and comparing the same to at least one threshold;
    threshold adjusting means for adjusting the value of said threshold;
    peak-value detecting means for receiving at least a portion of said signal and for cooperating with said threshold adjusting means to adjust said threshold; and,
    charge-equalization means for restoring the charge on said coupling capacitor drawn off by said peak-value detecting means.

2. The circuit arrangement of claim 1, said charge-equalization means comprising a resistor network connected to said coupling capacitor.

3. The circuit arrangement of claim 1, said peak-value detecting means comprising a peak-value detector circuit connected directly to said coupling capacitor.

4. The circuit arrangement of claim 3, said peak-value detector circuit comprising a series circuit including switching means and a peak-value storage capacitor connected in series with said switching means.

5. The circuit arrangement of claim 4, said switching means being a diode.

6. A circuit arrangement for evaluating the output signals of an inductive sensor, the circuit arrangement comprising:
    a coupling capacitor for receiving the signal of said sensor;
    a comparator connected to said coupling capacitor for receiving said signal and comparing the same to at least one threshold;
    said comparator including a differential amplifier having an output as well as an inverting input and a non-inverting input; and, a positive-feedback capacitor connected between said non-inverting input and said output;
    threshold adjusting means for adjusting the value of said threshold;
    peak-value detecting means for receiving at least a portion of said signal and for cooperating with said threshold adjusting means to adjust said threshold;
    said peak-value detecting means including a peak-value detector circuit connected directly to said coupling capacitor, said peak-value detector circuit having a series circuit including switching means and a peak-value storage capacitor connected in series with said switching means; and,
    charge-equalization means for restoring the charge on said coupling capacitor drawn off by said peak-value detecting means.

7. The circuit arrangement of claim 6, said differential amplifier including an input resistor connected between said storage capacitor and one of said inputs.

8. The circuit arrangement of claim 6, said circuit arrangement further comprising an amplifier connected between said storage capacitor and one of said inputs of said differential amplifier.

9. The circuit arrangement of claim 6, said circuit arrangement further comprising an isolating resistor connected between said coupling capacitor and said inverting input of said differential amplifier.

10. The circuit arrangement of claim 6, said circuit arrangement further comprising an operating-point adjusting resistor connected between said non-inverting input of said differential amplifier and ground.

11. The circuit arrangement of claim 6, said circuit arrangement further comprising: current supply means; a voltage divider connected between said current supply means and ground and having a center connection; and, a resistor connected between said connection and said coupling capacitor; and, said coupling capacitor being connected directly to said non-inverting input of said differential amplifier.

12. A circuit arrangement for evaluating the output signals of an inductive sensor, the circuit arrangement comprising:
    a coupling capacitor having a first terminal connected directly to the sensor for receiving the signal thereof, said coupling capacitor also having a second terminal;
    a comparator connected to said second terminal of said coupling capacitor for receiving said signal and comparing the same to at least one threshold;
    threshold adjusting means for adjusting the value of said threshold;

peak-value detecting means for receiving at least a portion of said signal and for cooperating with said threshold adjusting means to adjust said threshold;

current supply means for supplying current to said circuit arrangement; and, charge-equalization means connected between said second terminal of said coupling capacitor and said current supply means for restoring the charge on said coupling capacitor drawn off by said peak-value detecting means.

* * * * *